US012683304B2

(12) United States Patent
Kropiewnicki et al.

(10) Patent No.: US 12,683,304 B2
(45) Date of Patent: Jul. 14, 2026

(54) CONTACT SPRING ASSEMBLY FOR THE SELF-LOCKING CONTACTING OF A WIRE OF AN ELECTRICAL CONDUCTOR

(71) Applicant: HARTING Electric Stiftung & Co. KG, Espelkamp (DE)

(72) Inventors: Norbert Kropiewnicki, Bielefeld (DE); Daniel Wesseler, Melle (DE); Sergej Zier, Löhne (DE); Nicole Spilker, Lübbecke (DE); Arno Westpfahl, Espelkamp (DE); Timm Meyrose, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 422 days.

(21) Appl. No.: 18/279,369

(22) PCT Filed: Feb. 28, 2022

(86) PCT No.: PCT/DE2022/100162

§ 371 (c)(1),
(2) Date: Aug. 29, 2023

(87) PCT Pub. No.: WO2022/188920

PCT Pub. Date: Sep. 15, 2022

(65) Prior Publication Data

US 2024/0204428 A1 Jun. 20, 2024

(30) Foreign Application Priority Data

Mar. 10, 2021 (DE) ..................... 10 2021 105 734.5

(51) Int. Cl.
*H01R 4/48* (2006.01)

(52) U.S. Cl.
CPC ........... *H01R 4/484* (2023.08); *H01R 4/4821* (2023.08)

(58) Field of Classification Search
CPC .... H01R 4/4821; H01R 4/484; H01R 4/4846; H01R 13/11; H01R 13/112
(Continued)

(56) References Cited

U.S. PATENT DOCUMENTS

2007/0099479 A1 5/2007 Holterhoff et al.
2009/0197479 A1 * 8/2009 Glick .................... H01R 13/111 439/752
2017/0012368 A1 1/2017 Aboulkassem et al.

FOREIGN PATENT DOCUMENTS

AT 289926 B 5/1971
DE 10355195 A1 7/2005
(Continued)

*Primary Examiner* — Christopher M Koehler
*Assistant Examiner* — Gregory L Mangot
(74) *Attorney, Agent, or Firm* — Smartpat PLC

(57) ABSTRACT

A contact spring assembly for the self-locking contacting of a wire (28) of an electrical conductor includes a support wall (24) made of a conductive material and a contact spring (10). The contact spring (10) has a base leg (20) held stationary with respect to the support wall and a clamping leg (18) which, together with the support wall (24), forms an insertion receptacle (26) for the wire (28) of the conductor. The insertion receptacle is tapered in the insertion direction. The base leg (20) of the contact spring transitions into a holding leg (22' 22'), which is inserted into a receiving shaft (30) stationary with respect to the support wall (24) and has two detent projections (38), which protrude perpendicularly to the base leg in opposite directions and are locked to mating contours (34) on the walls of the receiving shaft.

6 Claims, 3 Drawing Sheets

(58) Field of Classification Search
USPC .......................................................... 439/862
See application file for complete search history.

(56) References Cited

FOREIGN PATENT DOCUMENTS

| | | | |
|---|---|---|---|
| DE | 202006009460 | U1 | 3/2007 |
| DE | 202009013335 | U1 | 12/2010 |
| DE | 202017006317 | U1 | 3/2019 |

* cited by examiner

CONTACT SPRING ASSEMBLY FOR THE SELF-LOCKING CONTACTING OF A WIRE OF AN ELECTRICAL CONDUCTOR

CROSS-REFERENCE TO RELATED APPLICATION

This application is a national stage application, filed under 35 U.S.C. § 371, of International Patent Application PCT/DE2022/100162, filed on Feb. 28, 2022, which claims the benefit of German Patent Application DE 10 2021 105 734.5, filed on Mar. 10, 2021.

TECHNICAL FIELD

The disclosure relates to a contact spring assembly for the self-locking contacting of a wire of an electrical conductor.

BACKGROUND

An example of a contact spring assembly is described in DE 20 2006 009 460 U1. The supporting wall can be part of a conductive structure, for example a busbar or a plug connector contact. In order to bring the wire of the conductor into contact with this structure, a stripped end of the wire (e.g. a copper wire) is inserted into the plug-in receptacle. During this process, the end of the wire slides onto the flank of the clamping leg and deflects this clamping leg. Owing to the elastic restoring force of the spring, a gripping edge formed at the free end of the clamping leg engages in the circumferential surface of the copper wire. If an attempt is now made to retract the conductor, the force exerted by the wire on the gripping edge has the tendency to pivot the clamping leg further in the direction of the supporting wall and to press it even more firmly against the wire, with the result that the wire is held in position in a self-locking manner.

To release the contact again, a release member is displaced in the insertion direction, with the result that an actuating arm runs onto the flank of the clamping leg and bends it back. The wire of the conductor is thereby released, allowing the conductor to be withdrawn from the plug-in receptacle.

In the known assembly, the base leg of the contact spring is riveted to a part of the busbar, ensuring that the contact spring is reliably held in position even when subject to the action of high tensile forces.

SUMMARY

A contact spring assembly for the self-locking contacting of a wire of an electrical conductor has a supporting wall formed from a conductive material and a contact spring. The contact spring has a base leg held stationary in relation to the supporting wall and a clamping leg, which, together with the supporting wall, forms a plug-in receptacle for the wire of the conductor. The receptacle tapers in the insertion direction.

An object underlying the disclosure is to provide a contact spring assembly which is easier to assemble.

This object is achieved by the fact that the base leg of the contact spring merges into a holding leg, which is inserted into a receiving shaft stationary in relation to the supporting wall and has two latching projections, which project in opposite directions transversely to the base leg and are latched with mating contours on the walls of the receiving shaft.

The insertion and fixing of the contact spring in the structure forming the supporting wall can take place in a simple linear movement in which the holding leg is inserted into the receiving shaft until the latching projections automatically latch on the mating contours. The assembly process can therefore be carried out with an automatic assembly machine of simple construction which does not have to have a complex movement scheme and can therefore operate at a high cycle rate. The latching projections and the mating contours can be configured in such a way that the latching can withstand the pull-out forces to be expected in normal operation, which have the tendency to pull the holding leg back out of the receiving shaft. In spite of the simple assembly process, secure fixing of the contact spring can therefore be achieved.

In one embodiment, the supporting wall is part of an electrically conductive structure which also forms the receiving shaft for the holding leg of the contact spring. The latching thus simultaneously improves the electrical contact between the contact spring and the conductive structure.

It is possible, for example, for the receiving shaft to be formed by two parallel grooves, into which two latching arms of the fork-shaped holding leg engage. The grooves can be easily produced by machining. The mating contours can be formed, for example, by an end face in which the grooves end. In other embodiments, the receiving shaft and the mating contours can also be formed by reshaping the metal body, for example by producing at least part of the conductive structure from a profiled strip with a corresponding groove profile.

The contact spring can be produced simply and efficiently as a stamped and bent part. The latching projections can then be produced in any desired shape in a single operation during the stamping process. For example, the latching projections can be designed as barbs, thus enabling positive locking or self locking of the holding leg in the receiving shaft.

In one embodiment, the insertion direction in which the holding leg is inserted into the receiving shaft is parallel to the insertion direction of the plug-in receptacle for the wire of the conductor. The contact spring assembly often also has an actuator, which is movable in this insertion direction and which is used to bend the clamping leg of the contact spring away from the wire of the conductor and thus cancel the clamping when the wire is to be released. In this case, a further rationalization of automated production is made possible by the fact that the movements during the installation of the actuator and during the installation of the contact springs take place in the same direction.

In another embodiment, the insertion direction of the holding leg extends at right angles to the insertion direction of the plug-in receptacle. In this case, the tensile forces acting on the contact spring when an attempt is made to pull the wire of the conductor out of the plug-in receptacle counter to the clamping force are absorbed in a positive-locking manner by the engagement of the holding leg in the receiving shaft, thus ensuring that even relatively weak latching is sufficient to fix the holding leg.

Exemplary embodiments are explained in greater detail below with reference to the drawing.

DETAILED DESCRIPTION

Figure 1:
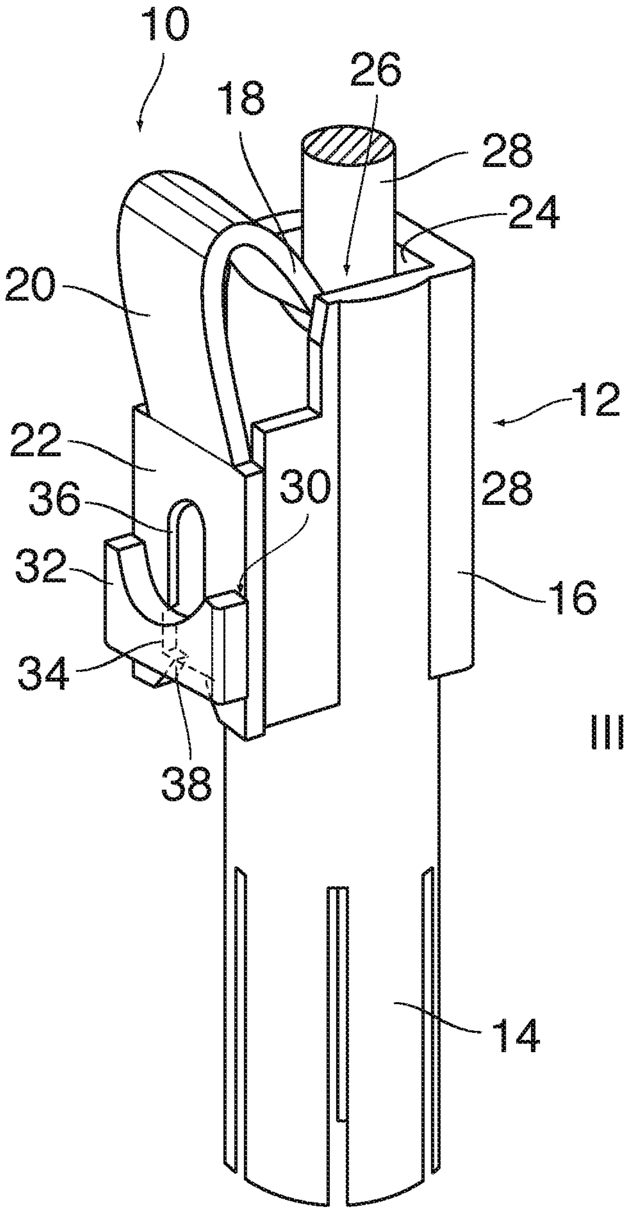
FIG. 1 shows a perspective view of a contact spring assembly.

The contact spring assembly shown in FIG. 1 has a contact spring 10 made of metal and an electrically conductive supporting structure 12, which in the example shown forms a socket contact 14 as well as a cage 16 axially adjoining the latter, which is also referred to as a busbar. The contact spring 10 has a clamping leg 18 and a base leg 20, which is connected to the clamping leg 18 via a U-bend and merges at the opposite end into a flat holding leg 22.

With its holding leg 22, the contact spring 10 is held on the cage 16 in such a way that the clamping leg 18 projects obliquely into the interior of the cage and, with a supporting wall 24 of the cage opposite the contact spring, forms a plug-in receptacle 26 for a wire 28 of an electrical conductor, which in this way is fixed mechanically in the cage and electrically connected to the supporting structure 12. The wire 28 is held with a clamping action between the clamping leg 18 and the supporting wall 24 and, since the clamping leg engages on the wire obliquely, the wire is fixed in the cage in a self-locking manner when a tensile force acts in the pull-out direction on the wire 28.

On the side opposite the supporting wall 24, the cage 16 forms a receiving shaft 30, which extends in the insertion direction of the plug-in receptacle 24 and into which the fork-shaped holding leg 22 of the contact spring 10 is inserted from above in FIG. 1. The receiving shaft 30 is formed by two parallel grooves in the outer surfaces of the cage 16, which grooves are delimited by a bracket 32 on the side facing away from the plug-in receptacle. This bracket is connected to the main part of the cage 16 only via a web 34, which extends through a slot 36 between the fork arms of the holding leg 22. The fork arms of the holding leg 22 each form, in the region of their free end, two latching projections 38 directed toward one another, which engage under the web 34 and thus fix the holding leg 22 in the receiving shaft 30 with a latching action.

Figure 2:
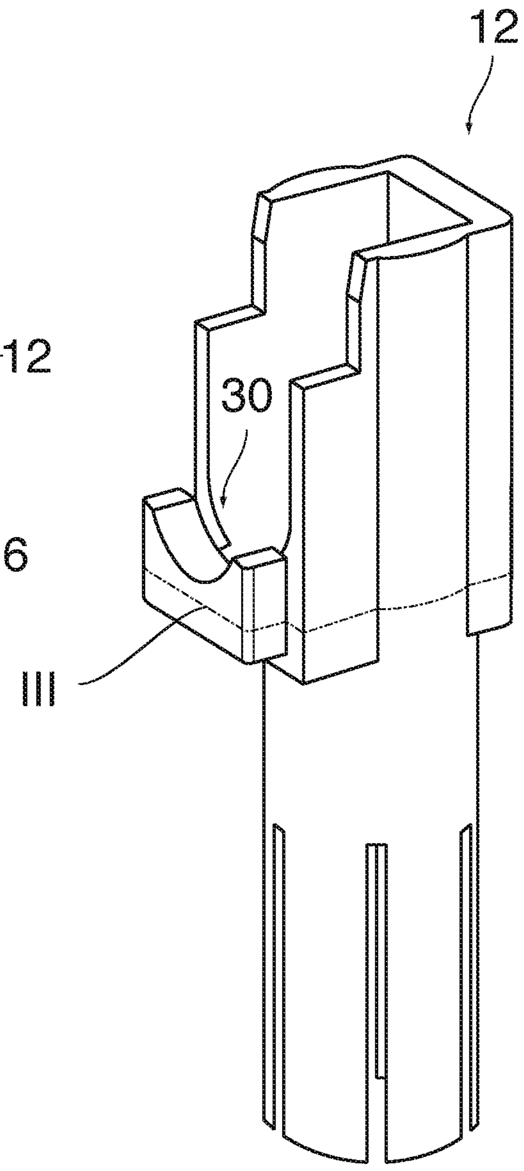
FIG. 2 shows a perspective view of an electrically conductive supporting structure of the contact spring assembly.

In FIG. 2, the supporting structure 12 is shown without the contact spring 10, allowing the receiving shaft 30 to be seen more clearly.

Figure 3:
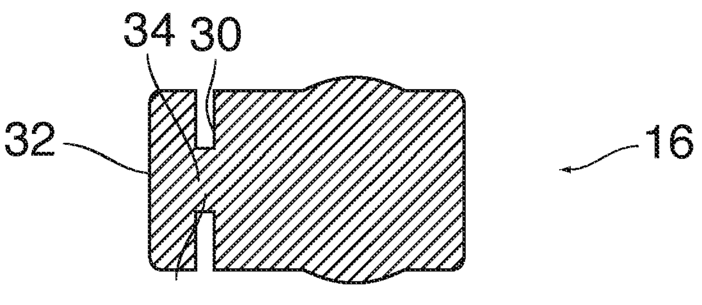
FIG. 3 shows a section through the supporting structure in section plane III in FIG. 2.

FIG. 3 shows a cross section of the cage 16 in the section plane III indicated by dash-dot lines in FIG. 2 and makes it possible to see the exact cross-sectional shape of the bracket 32 as well as the web 34 and the grooves forming the receiving shaft 30. As an option, the cage or the entire supporting structure can be produced from a profiled strip, which has the profile shown in FIG. 3.

Figure 4:
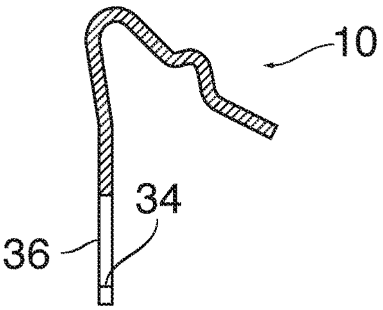
FIG. 4 shows an axial section through a contact spring.
Figure 5:
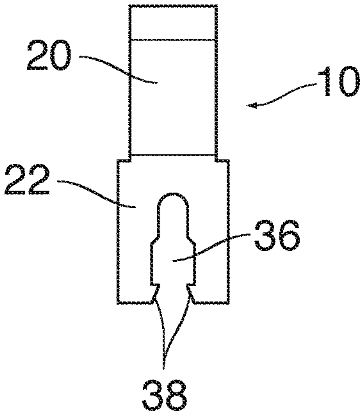
FIG. 5 shows the contact spring in a view from the left in FIG. 4.

In FIG. 4, the contact spring 10 is shown in an axial section, while FIG. 5 shows a front view of the base leg 20 and the holding leg 22 of the contact spring. The outline of the slot 36 and of the latching projections 38 designed as barbs can be seen in FIG. 5.

Figure 6:
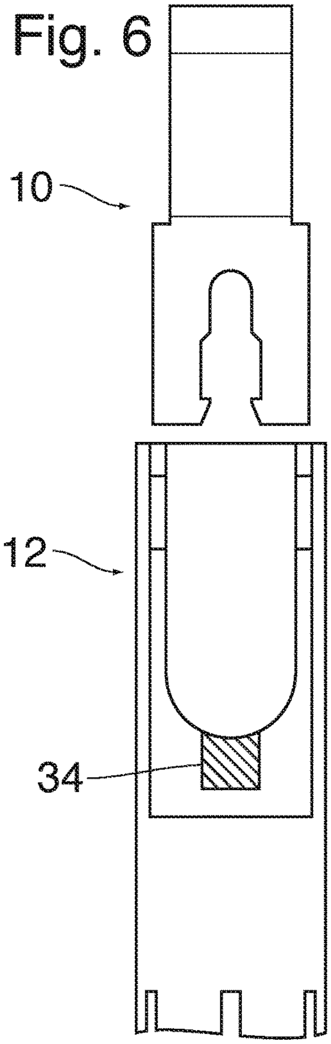
FIGS. 6 to 8 show different stages during the insertion of the contact spring into the supporting structure.

FIG. 6 shows an enlarged view of the contact spring 10 and the supporting structure 12 in a state prior to insertion of the holding leg into the receiving shaft. Here, the supporting structure 12 is shown in a section in a section plane which passes through the web 34.

Figure 7:
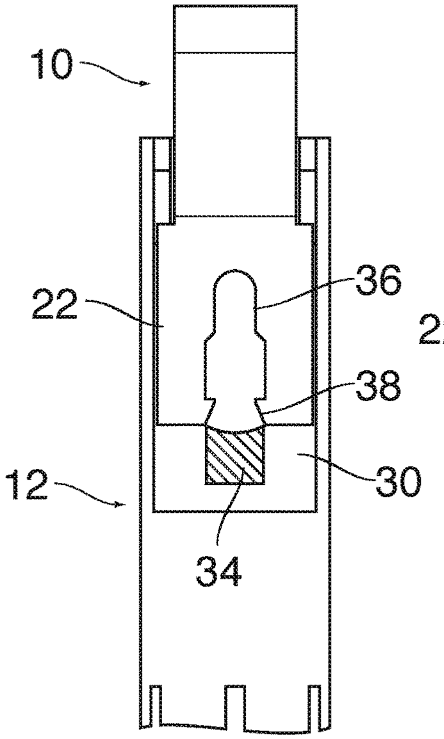

FIG. 7 shows the contact spring 10 and the supporting structure 12 in the state in which the holding leg 22 enters the receiving shaft 30 with its free end and the flanks of the latching projections 38 run onto the upper edges of the web 34. At this stage, the clamping leg (not visible in FIG. 7) of the contact spring is already in engagement in the plug-in receptacle 24, as a result of which the contact spring receives guidance and its slot 36 is centered on the web 34. If the contact spring 10 is now pressed further down, a somewhat greater resistance must be overcome since the fork arms of the holding leg 22 are spread apart elastically by the web 34 until the latching projections 38 can slide over the web.

Figure 8:
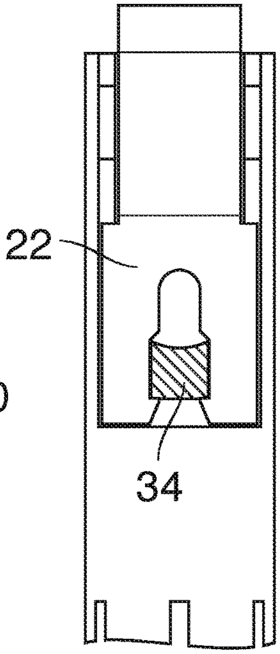

FIG. 8 shows the end state, in which the fork arms of the holding leg 22 have sprung back again elastically into their original position and are now in engagement under the underside of the web 34. This underside of the web thus forms a mating contour for the latching projections 38. This mating contour and the upper sides of the latching projections 38 resting thereon run at right angles to the insertion direction, with the result that the holding leg 22 is locked positively in its receiving shaft when an upwardly directed pull-out force acts on the contact spring.

FIGS. 9 to 12 show a modified exemplary embodiment of the contact spring assembly.

Figure 9:
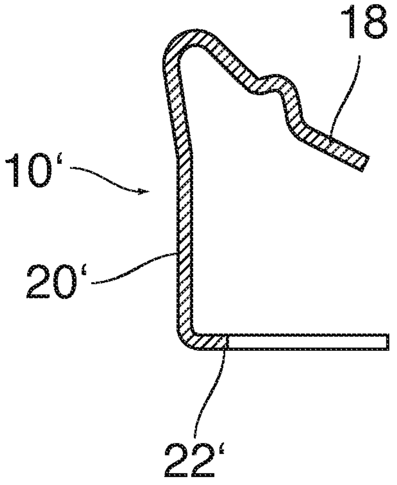
FIG. 9 shows an axial section through a contact spring according to another exemplary embodiment.

FIG. 9 shows an axial section through a contact spring 10', which differs from the above-described contact spring 10 in that it has an extended base leg 20', which merges at the free end into a holding leg 22' angled at right angles to the side of the clamping leg 18.

Figure 10:
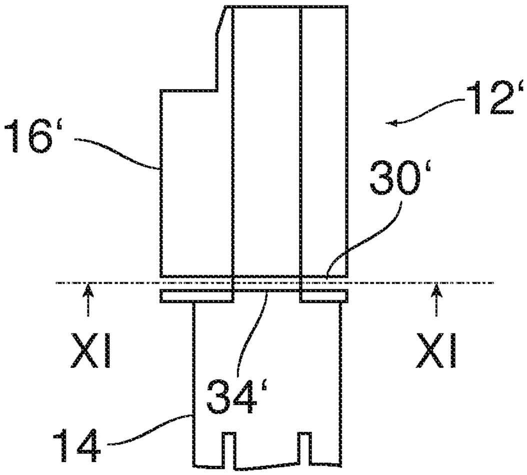
FIG. 10 shows a side view of part of a supporting structure for the contact spring according to FIG. 9.

FIG. 10 shows the upper part of an associated supporting structure 12'. In the region of the lower end of a cage 16', this supporting structure forms a horizontally extending receiving shaft 30' for the holding leg 22'.

Figure 11:
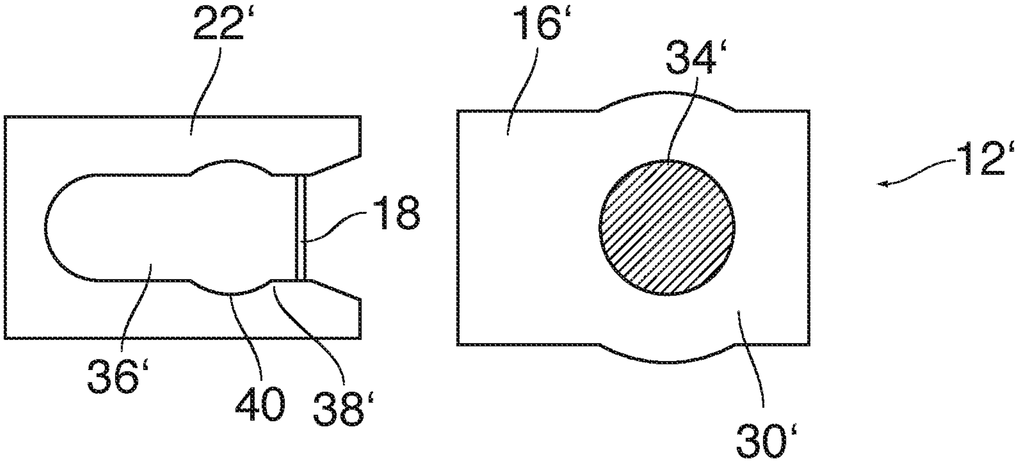
FIG. 11 shows an exploded view of the contact spring and the supporting structure according to FIG. 10, wherein the supporting structure is shown in a section in plane XI-XI in FIG. 10.

As shown in FIG. 11, the upper part of the cage 16' is connected to the lower part of the cage, which at the same time forms the upper end of the socket contact 14, only by a short cylindrical web 34'. The holding leg 22' is again of fork-shaped design and has a slot 36' with two circular segment-shaped indentations 40, which are complementary to the circumferential surface of the web 34'. Those ends of these indentations 40 which are located toward the free end of the holding leg form latching projections 38'.

Figure 12:
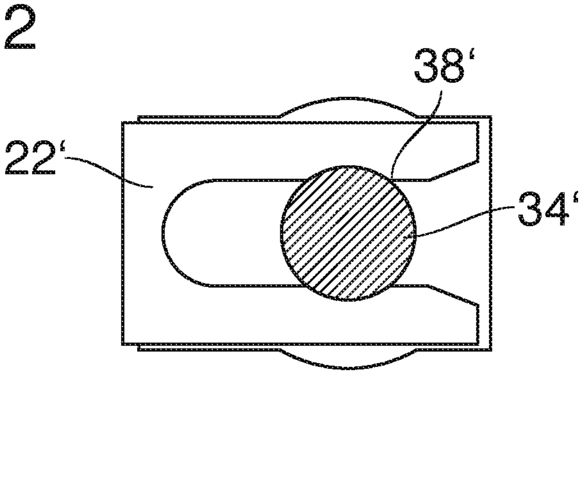
FIG. 12 shows the contact spring in its position latched on the supporting structure.

When the holding leg 22' is inserted into the receiving shaft 30, as shown in FIG. 12, the latching projections 38' engage with a latching action behind the circumferential surface of the web 34, which thus forms a mating contour for the latching projections.

The invention claimed is:

1. A contact spring assembly for self-locking contacting of a wire (28), comprising:

a supporting wall (24) formed from a conductive material; and a contact spring (10; 10'), the contact spring (10; 10') having a base leg (20; 20') held stationary in relation to the supporting wall and a clamping leg (18), wherein the clamping leg (18), together with the supporting wall (24), forms a plug-in receptacle (26) for the wire (28), wherein the plug-in receptacle (26) tapers in an insertion direction, wherein the base leg (20; 20') of the contact spring merges into a holding leg (22; 22'), wherein the holding leg (22; 22') is inserted into a receiving shaft (30; 30') stationary in relation to the supporting wall (24), wherein the holding leg (22; 22') has two latching projections (38; 38'), wherein the two latching projections (38; 38') project in opposite directions transversely to the base leg and are latched with mating contours (34; 34') on walls of the receiving shaft (30; 30'), wherein the receiving shaft (30; 30') is formed by two parallel grooves, wherein the two parallel grooves are open at least at one end, wherein the holding leg (22; 22') of the contact spring is of fork-shaped design, wherein the mating contours for the latching projections (38; 38') are formed on a web (34; 34'), wherein the web (34; 34') extends through a slot (36; 36') formed between fork arms of the holding leg (22; 22'), wherein the web (34; 34') connects a bracket (32) to the supporting wall (24), and wherein the bracket (32) forms an outer boundary of the two parallel grooves.

2. The contact spring assembly as claimed in claim 1, wherein the receiving shaft (30; 30') is formed in an electrically conductive supporting structure (12; 12'), and wherein the supporting structure (12; 12') forms the supporting wall (24).

3. The contact spring assembly as claimed in claim 1, wherein the receiving shaft (30) extends parallel to the insertion direction of the plug-in receptacle (26).

4. The contact spring assembly as claimed in claim 3, wherein the latching projections (38) are designed as barbs.

5. The contact spring assembly as claimed in claim 3, wherein the slot (36') of the holding leg (22') is widened over a partial length of the slot (36') by two mutually opposite indentations (40), and wherein the latching projections (38') are formed at one end of each of the two mutually opposite indentations.

6. The contact spring assembly as claimed in claim 1, wherein the receiving shaft (30') extends at right angles to the insertion direction of the plug-in receptacle (26).

* * * * *